United States Patent
McLean et al.

(10) Patent No.: US 10,591,289 B2
(45) Date of Patent: Mar. 17, 2020

(54) METHOD FOR MEASURING AN ARTEFACT

(71) Applicant: RENISHAW PLC, Gloucestershire (GB)

(72) Inventors: Calum Conner McLean, Edinburgh (GB); Ian William McLean, Edinburgh (GB)

(73) Assignee: RENISHAW PLC, Wotton-under-Edge (GB)

( * ) Notice: Subject to any disclaimer, the term of this patent is extended or adjusted under 35 U.S.C. 154(b) by 0 days.

(21) Appl. No.: 15/577,191

(22) PCT Filed: Jul. 11, 2016

(86) PCT No.: PCT/GB2016/052079
§ 371 (c)(1),
(2) Date: Nov. 27, 2017

(87) PCT Pub. No.: WO2017/009615
PCT Pub. Date: Jan. 19, 2017

(65) Prior Publication Data
US 2018/0156608 A1    Jun. 7, 2018

(30) Foreign Application Priority Data

Jul. 13, 2015  (EP) .................................. 15275170

(51) Int. Cl.
*G01B 11/14*    (2006.01)
*G01B 21/04*    (2006.01)
(Continued)

(52) U.S. Cl.
CPC .......... *G01B 21/042* (2013.01); *G01B 11/002* (2013.01); *G01B 11/2518* (2013.01)

(58) Field of Classification Search
CPC ....... G01B 11/00; G01B 11/14; G01B 11/026; G01B 11/0608; G01S 17/48
(Continued)

(56) References Cited

U.S. PATENT DOCUMENTS 4,508,453 A * 4/1985 Hara ................... G01N 21/956
                                                            348/126
5,251,156 A    10/1993 Heier et al.
(Continued)

FOREIGN PATENT DOCUMENTS

DE    102007008598 A1    8/2008
WO    2009/024756 A1     2/2009
(Continued)

OTHER PUBLICATIONS

Jung, Franck, et al. "Extracting 3D Edgel Hypotheses From Multiple Calibrated Images: A Step Towards the Reconstruction of Curved and Straight Object Boundary Lines", pp. 1-5.
(Continued)

*Primary Examiner* — Md M Rahman
(74) *Attorney, Agent, or Firm* — Oliff PLC

(57) ABSTRACT

A method of measuring at least one point on an artefact to be inspected that is located within a positioning apparatus' measurement volume, the method comprising, obtaining at least two images of the artefact obtained from different perspectives and, based on a given nominal location of a predetermined point to be measured within said positioning apparatus' measurement volume, determine the location of said predetermined point in each of the at least two images.

22 Claims, 13 Drawing Sheets

Figure 1:
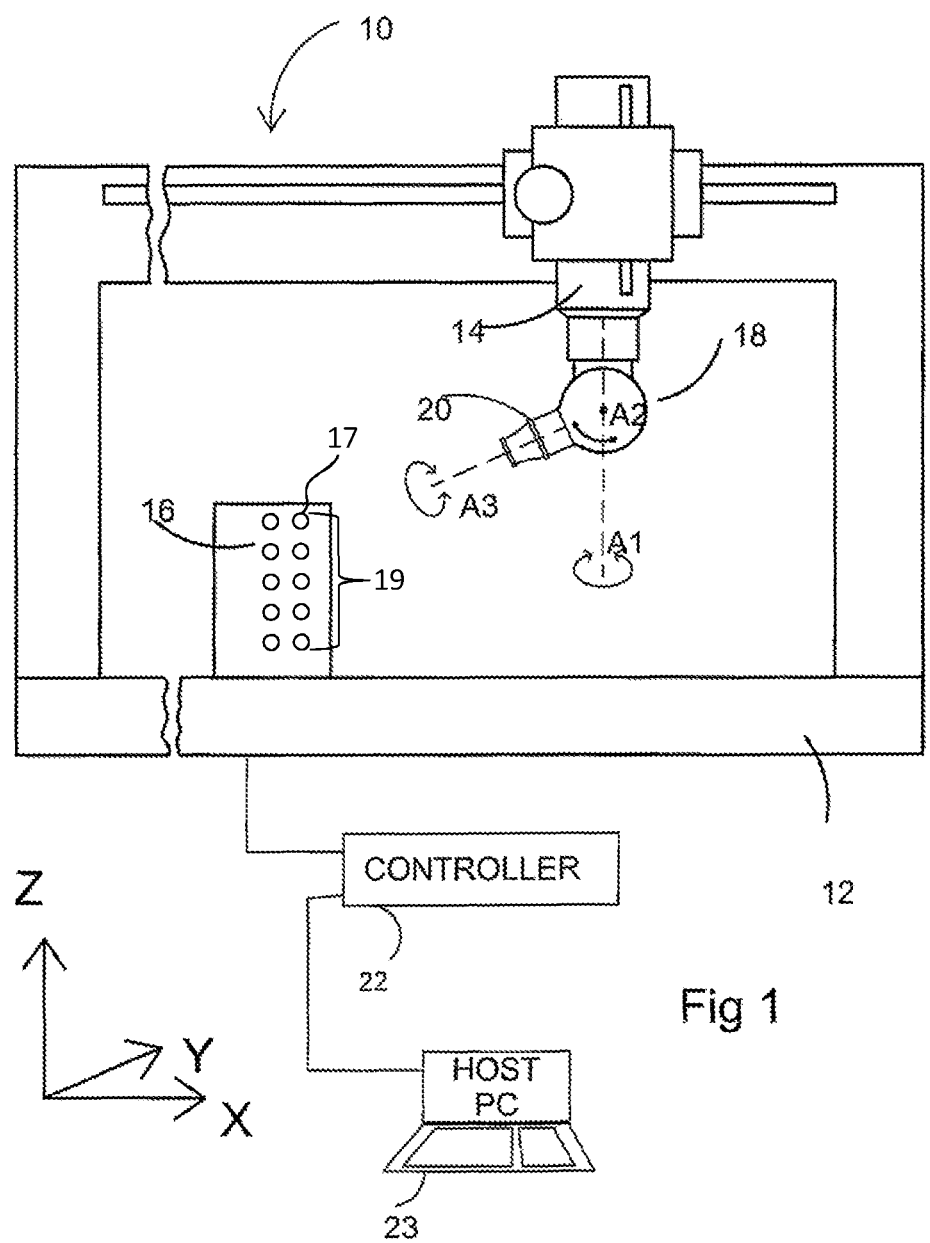

(51) Int. Cl.
*G01B 11/00* (2006.01)
*G01B 11/25* (2006.01)

(58) Field of Classification Search
USPC .......................................................... 356/623
See application file for complete search history.

(56) References Cited

U.S. PATENT DOCUMENTS

| | | | | |
|---|---|---|---|---|
| 6,831,738 B2* | 12/2004 | Rogers | ............... | G01N 21/9515 356/244 |
| 8,338,743 B2 | 12/2012 | Wanner et al. | | |
| 2002/0079434 A1* | 6/2002 | Kimura | ................ | G01V 8/24 250/227.11 |
| 2003/0004412 A1* | 1/2003 | Izatt | .................... | A61B 5/0066 600/425 |
| 2003/0026567 A1* | 2/2003 | Cryan | .............. | B29D 11/00682 385/124 |
| 2003/0174319 A1* | 9/2003 | Buzzetti | ............... | G02B 6/3807 356/237.1 |
| 2003/0174875 A1* | 9/2003 | Buzzetti | ............... | G01M 11/081 382/141 |
| 2003/0202754 A1* | 10/2003 | Kato | .................... | G02B 6/4292 385/89 |
| 2004/0196459 A1* | 10/2004 | Cyr | ........................ | G01N 21/31 356/344 |
| 2007/0183631 A1 | 8/2007 | Zhang et al. | | |
| 2008/0235970 A1* | 10/2008 | Crampton | .............. | B25J 13/088 33/503 |
| 2009/0025463 A1* | 1/2009 | McFarland | .......... | G01B 21/045 73/104 |
| 2010/0135534 A1* | 6/2010 | Weston | ................ | G01B 11/007 382/106 |
| 2011/0264402 A1* | 10/2011 | Anderson | .............. | G01B 21/04 702/150 |
| 2012/0072170 A1* | 3/2012 | McKendrick | ........ | G01B 11/005 702/150 |
| 2014/0205150 A1 | 7/2014 | Ogawa | | |
| 2014/0314276 A1 | 10/2014 | Wexler et al. | | |
| 2017/0295336 A1* | 10/2017 | Kimura | ................ | A61B 6/4233 |

FOREIGN PATENT DOCUMENTS

| | | |
|---|---|---|
| WO | 2015/085982 A1 | 6/2015 |
| WO | 2015/124756 A1 | 8/2015 |

OTHER PUBLICATIONS

Sep. 29, 2016 International Search Report issued in International Patent Application No. PCT/GB2016/052079.

Sep. 29, 2016 Written Opinion issued in International Patent Application No. PCT/GB2016/052079.

Fryer. "Camera Calibration" in KB Atkinson (ed), Close Range Photogrammetry and Machine Vision, Whittles Publishing, pp. 156-179, 1996.

Heikkilä et al. "A Four-step Camera Calibration Procedure with Implicit Image Correction", Conference in Computer Vision and Pattern Recognition, 1997.

* cited by examiner

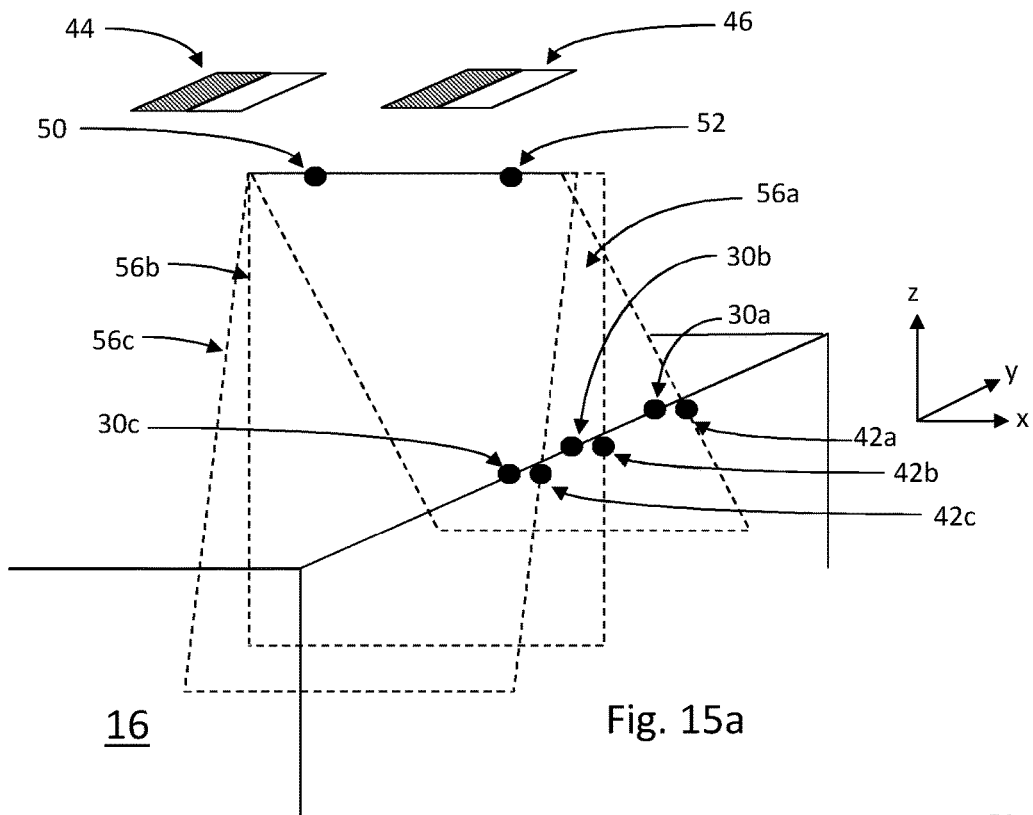
Fig. 15a
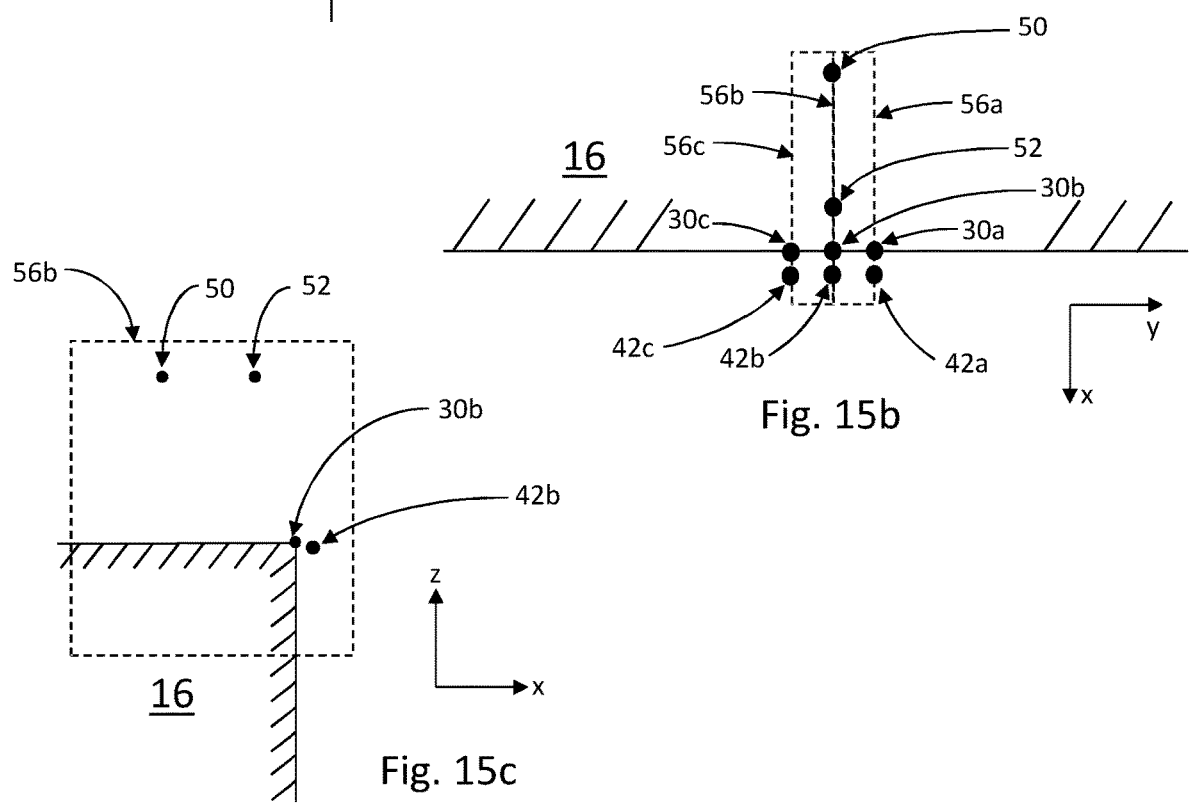
Fig. 15b
Fig. 15c

METHOD FOR MEASURING AN ARTEFACT

This invention relates to a method for measuring an artefact, in particular a method for measuring a point on an artefact, e.g. using a vision probe, e.g. camera probe, mounted on a positioning apparatus, such as coordinate positioning apparatus.

Triangulation and epipolar geometry are well known in the field of stereo vision for determining the location of a point/aspect of an artefact within a measurement volume from two or more images of the point obtained from different perspectives. For example, it is known to use epipolar geometry to confirm common points/features in multiple images, and then to use triangulation to determine the three dimensional position of the common points/features in the measurement volume. Such techniques can rely on the presence of target features (e.g. stickers) placed on the artefact, or features on the object which can be identified as a target feature. Alternatively, target features or optical patterns can be projected on the artefact and analysed to determine common points/features within the multiple images (e.g. WO2009024756).

However, it is not always possible, practical or desirable to place/project target features or optical patterns on the object. Furthermore, it might be desirable to measure a particular predetermined point on the artefact which would not be easily identifiable within an image. For example, it might be desirable to measure one or more points on an edge located within a bore where it is not practical to place or project target features onto the edge, and where there are no distinct features which enable the same point to be identified in multiple images.

The present invention provides a novel technique for enabling an artefact to be measured. The present invention comprises using predetermined knowledge of where a point to be inspected is expected to be so as to deduce the location of the point in at least one image, e.g. in each of a plurality of images obtained from different perspectives.

Accordingly, there is provided a method of inspecting (e.g. measuring) an artefact that is located within a positioning apparatus' measurement volume, the method comprising: obtaining at least one image of the artefact and, based on a given nominal location of a predetermined point on the artefact to be measured within said positioning apparatus' measurement volume, finding said predetermined point in said at least one image.

At least two images can be obtained. The at least to images could, for example have been captured from different (e.g. known) perspectives. Accordingly, based on a given nominal location of a predetermined point on the artefact to be measured within said positioning apparatus' measurement volume, the method can comprise finding said predetermined point in said at least two images.

The method can comprise determining the actual location of said predetermined point in said positioning apparatus' measurement volume. Determining the actual location of said predetermined point in said positioning apparatus' measurement volume could be based on the determined location of the predetermined point in said image(s). Measuring the actual location can comprise triangulating the actual location of said predetermined point in said positioning apparatus' measurement volume. In this case, knowledge of the images' perspective (e.g. perspective centre) can be used in the triangulation process.

The method can comprise receiving an indication of a predetermined point on an artefact to be measured. The method can comprise determining the nominal location of said predetermined point within said positioning apparatus' measurement volume. Said indication can comprise an identified point on a computer representation (e.g. model, e.g. 3D model) of the artefact. Said computer model could comprise a computer aided design "CAD" model of the artefact. The predetermined point could be user/operator selected. Accordingly, the method can comprise a user/operator selecting a point to be inspected, e.g. on a computer representation of the artefact. Optionally, the predetermined point is automatically identified or specified. For example, feature recognition could be used, e.g. on a computer model to identify a predetermined point. Optionally, the predetermined point could be specified (either manually or automatically) during the creation of the computer model.

The predetermined point can comprise a point on an edge of said artefact. Optionally, the point comprises a point on/within a hole. Optionally, the point comprises a point on an edge on/within a hole. The hole could have a diameter of not more than 3 mm, for instance not more than 2 mm, for example not more than 1 mm, for instance approximately 0.5 mm.

The artefact could be a component containing one or more small holes (e.g. cooling holes). The artefact could be an engine component, e.g. a jet engine component, e.g. a turbine blade or combustor component.

The at least two images can comprise contrast/silhouette images of the artefact, e.g. of the edge. The artefact could be back-lit, but as will be understood this need not necessarily be the case and could for instance be front-lit.

Determining where said predetermined point actually is in an image can comprise determining a search line along which to search within the image. Optionally, this can be based on the nominal location of the predetermined point (and optionally a nominal direction vector associated with the predetermined point). The method can further comprise identifying where along said search line the image meets predetermined criteria. Said predetermined criteria can comprise a threshold rate of change in a property of the image, e.g. in the contrast of the image, and/or in the intensity of the image. The search line could be obtained via projection of a vector into the image, e.g. via projection of a vector defined with respect to the measurement volume. The vector could pass through the nominal location. Optionally the vector is parallel to a nominal direction vector associated with the predetermined point. Optionally, the vector is derived by the projection of a nominal direction vector associated with the predetermined point into a plane (which could be defined at least in part by said nominal location).

Optionally, a projector could be provided which is configured to project an optical form onto the artefact. For example, the projector could be configured to project one or more lines. The projector could be configured to project an optical pattern. For instance, the projector could be configured to project a structured light pattern, such as a fringe field. In this case, for example, said predetermined criteria could comprise a threshold rate of change in the phase of the pattern falling on the artefact.

The search line can comprise the epipolar line for the nominal location of said predetermined point. That is the search line can comprise an image's epipolar line for the nominal location of said predetermined point. In the case in which at least two images are obtained from different perspectives, the search/epipolar line can be derived from a plane containing the perspective centres of the at least two images and said nominal location of said predetermined point. Such plane can be what is commonly known as the epipolar plane. Determining the search/epipolar line can comprise projecting a nominal direction vector associated with the predetermined point to be measured into the at least two images.

A nominal direction vector could be a predetermined vector. In other words, the nominal direction vector could be a predetermined search vector, e.g. associated with the predetermined point. As will be understood, the nominal direction vector could be used to dictate the direction of the search line. The nominal direction vector (e.g. the search vector) could be defined with respect to the measurement volume. The nominal direction vector could be manually or automatically determined. Optionally, the nominal direction vector is substantially normal to the surface (or edge) at the predetermined point (e.g. normal the surface/edge at the point where the predetermined point lies). As will be understood, in the case of a point on an edge, the nominal direction vector can be normal to any of the surfaces that meet at said edge or a direction in between. Which surface to base the normal (and hence the nominal direction vector) on could be manually or automatically selected.

The method can comprise projecting (e.g. orthographically) the nominal direction vector into a plane containing the perspective centres of the at least two images and said nominal location of said predetermined point. In other words the method can comprise projecting (e.g. orthographically) the nominal direction vector into the epipolar plane.

The search/epipolar line can be bounded. Providing such a bounded search/epipolar line can limit the extent along which the search is conducted. The boundaries of the search/epipolar line can lie on either side of the predetermined point to be inspected. The boundaries can be determined with respect to the nominal location of the predetermined point. In particular, the boundaries can be defined by virtue of boundaries placed on the nominal direction vector (e.g. which may have been projected into the epipolar plane), such boundaries lying on either side of the nominal location. The position of such boundaries (e.g. their distance from the nominal location) can be manually or automatically defined. E.g. they could be determined to be positioned at a predefined distance which is dependent on the expected manufacturing tolerances of the artefact.

The method can comprise determining whether the angle of intersection between the search/epipolar line and the imaged surface (e.g. edge) of the artefact meets predetermined threshold criteria (e.g. whether said angle of intersection is less than a predetermined angle). The method could comprise aborting the process of determining the location of said predetermined point within the images if it is determined that said predetermined threshold criteria is not met. It can be preferred that the search/epipolar line is substantially normal to the imaged surface (e.g. edge) of the artefact. Accordingly, the method can comprise aborting said process if the angle of intersection between said search/epipolar line and the imaged surface (e.g. edge) of the artefact is less than 45 degrees, for instance less than 60 degrees, and optionally less than 75 degrees.

Optionally, the search line is derived from a nominal direction vector (e.g. as described above, a predetermined search vector) associated with the predetermined point. For example, the nominal direction vector could be projected into the image(s). Bounds could be applied to the nominal direction vector. As with the above explanation, such bounds could be determined automatically, e.g. the bounds could be positioned at predefined distances along the nominal direction vector, on either side of the nominal location. Accordingly, for example, the bounded nominal direction vector could be projected into the image(s) (e.g. via perspective projection). Such a technique can be useful when only one image is obtained, and/or when it is not desired/possible to establish an epipolar plane/line.

Obtaining at least one image of the artefact can comprise receiving at least one image of the artefact. For example, obtaining at least one image of the artefact can comprise receiving at least one image from a stored location, e.g. retrieving at least one image from memory. Accordingly, the at least one image could have been previously captured, e.g. during a separate/previous process, and optionally by a separate apparatus/device.

Obtaining at least one image of the artefact can comprise operating an imaging device to take/capture at least one image of the artefact.

The method can comprise automatically determining the perspective from which to obtain/take/capture the at least one image based on the nominal location of said predetermined point (and optionally said nominal direction vector). The method can comprise automatically determining said different perspectives from which to obtain/take/capture the at least two images based on the nominal location of said predetermined point (and optionally said nominal direction vector). The method can comprise choosing perspectives which will put the predetermined point at the boundary/periphery of the surface of the artefact as imaged. For example, the perspectives can be selected such that as imaged, the predetermined point is put into contrast with the background, e.g. such that the point is one of many points that forms the edge of the imaged silhouette. Optionally, when the point to be inspected is part of a hole, the perspectives could be chosen such that a line containing the centre of perspectives is parallel to the hole's axis (e.g. coaxial with the hole's axis).

Optionally, the perspectives can be chosen such that the perspective centres of the images lie on either side of a desired tangent to the edge at the point to be inspected, optionally equally spaced on either side of a desired tangent.

The method can comprise choosing perspectives which are configured to such that the angle of intersection of the epipolar plane (e.g. defined by their centres of perspectives and the nominal location) with an edge/line on which the predetermined point is expected to lie meets predetermined criteria, e.g. is less than 45 degrees, for instance less than 60 degrees, and optionally less than 75 degrees.

As will be understood the edge/line could, for example, be a physical edge/line/feature on the artefact. For example, optionally said edge can comprise the boundary between two distinct facets of the artefact. Optionally, the edge comprises the boundary of a surface feature, e.g. of a printed feature or of a surface texture. Optionally, said edge/line is a conceptual edge/line, e.g. such as defined by a bright-line projected on the surface. As will be understood, the edge/line need not be straight, for example it could be curved or any regular or irregular shape.

The method can comprise determining the locations of a plurality of predetermined points in at least one image (and optionally in each of a set (e.g. pair) of images obtained from different (e.g. known) perspectives), based on given nominal locations of the plurality of predetermined points to be measured within said positioning apparatus' measurement volume. The method can comprise determining for each predetermined point, determining a search line and identifying where along said search line the image meets predetermined criteria.

In line with the above, each predetermined point could have an associated nominal direction vector (e.g. predetermined search vector).

The at least one image, e.g. the at least two images, can be obtained by at least one suitable imaging device. Suitable imaging devices can comprise at least one image sensor. For example, suitable imaging devices can comprise an optical electromagnetic radiation (EMR) sensitive detector, such as a charge-coupled device (CCD) or a complementary metal-oxide-semiconductor (CMOS). Optionally, suitable imaging devices can be optically configured to focus light at the image plane. As will be understood, the image plane can be defined by the image sensor. For example, suitable imaging devices can comprise at least one optical component configured to focus optical EMR at the image plane. Optionally, the at least one optical component comprises a lens. As will be understood, the term optical is used to refer to light having wavelengths from and including infra-red to ultra-violet, and not just visible light.

Imaging devices for use on coordinate positioning machines are commonly known in the field as video (inspection) probes, or camera (inspection) probes, and herein collectively referred to as vision (inspection) probes.

Suitable imaging devices can be based on the pinhole camera model which consists of a pinhole, which can also be referred to as the imaging device's perspective centre, through which optical EMR rays are assumed to pass before intersecting with the image plane. As will be understood, imaging devices that do not comprise a pinhole but instead comprise a lens to focus optical EMR also have a perspective centre and this can be the point through which all optical EMR rays that intersect with the image plane are assumed to pass.

As will be understood, the perspective centre can be found relative to the image sensor using a calibration procedure, such as those described in J. Heikkila and O. Silven, "A four-step camera calibration procedure with implicit image correction", Proceedings of the 1997 Conference in Computer Vision and Pattern Recognition (CVPR '97) and J. G Fryer, "Camera Calibration" in K. B. Atkinson (ed.) "Close range photogrammetry and machine vision", Whittles publishing (1996). Correction parameters such as those for correcting lens aberrations can be provided and are well known and are for instance described in these two documents.

The at least two images can be obtained by a common imaging device unit comprising at least one imaging device. The method can comprise relatively moving the imaging device unit and artefact between the obtaining of the images to achieve the different perspectives. The movement of the artefact and/or imaging device unit to achieve this could be performed manually or automatically. Optionally, the imaging device unit can comprise a plurality of imaging devices, and/or the images could be obtained by a plurality of separate image device units. Accordingly, in such cases, it might not be necessary to have relative movement in order to achieve the different perspectives, and if necessary or desired the images could be obtained simultaneously.

Optionally, the at least two images can be obtained by a single imaging device. The single imaging device can comprise a single image sensor. Accordingly, the at least two images can be obtained by a single image sensor. Accordingly, the artefact could be moved between obtaining each image in order to achieve the different perspectives. Optionally, the imaging device could be moved between the obtaining of the images in order to achieve the different perspectives. Accordingly, the method can comprise moving the imaging device from a first (e.g. known) perspective to a second (e.g. known) perspective.

The imaging device unit (e.g. a vision probe) can mounted on a coordinate positioning apparatus such that it can be moved in at least one linear degree of freedom, more preferably at least two linear degrees of freedom, especially preferably at least three linear degrees of freedom. Preferably the linear degrees of freedom are perpendicular to each other. Preferably the imaging device unit (e.g. a vision probe) is mounted on a coordinate positioning apparatus such that it can be rotated through at least one rotational degree of freedom, more preferably rotated through at least two rotational degrees of freedom, for example can be rotated through at least three rotational degrees of freedom. Preferably the at least two and at least three rotational degrees of freedom are about two (or three) substantially perpendicular axes. The rotational degrees of freedom can be provided by an articulating head on which the imaging device unit is mounted. Measurement devices which are moveable in three linear degrees of freedom and two rotational degrees of freedom are commonly referred to in the metrological industry as "five-axis" measurement devices. However, as will be understood, the invention is not limited to such systems and can be used with systems that facilitate movement through much more degrees of freedom, for instance through three, four or more rotational degrees of freedom.

The coordinate positioning apparatus can be a computer controlled coordinate positioning apparatus, for example a computer numerically controlled (CNC) coordinate positioning apparatus. Suitable coordinate positioning apparatus include coordinate measuring machines (CMM) and machine tools. Suitable coordinate positioning apparatus include, gantry, bridge and arm-type measurement apparatus, as well as robot arms.

The method can comprise an analyser device configured to determine the location of the predetermined point in each of the at least two images. The same or a different analyser device could be configured to determine the actual location of the predetermined point in the positioning apparatus' measurement volume.

As will be understood, the above described method can be a computer-implemented method. In other words, the method can be configured to receive at least one image of the artefact and, based on a given nominal location of a predetermined point on the artefact to be measured within said positioning apparatus' measurement volume, find said predetermined point in said at least one image. Accordingly, the method can be configured to receive at least two images of an artefact obtained from different (e.g. known) perspectives and, based on a given nominal location of a predetermined point to be measured within said positioning apparatus' measurement volume, determine the location of said predetermined point in each of the at least two images. Optionally, the computer method can be configured to control the positioning apparatus so as to obtain said at least one image, e.g. at least two images.

According to a second aspect of the invention there is provided a measurement apparatus comprising, at least one imaging device configured to obtain at least one image of the artefact and, at least one analyser device configured to process said at least one image so as to find said predetermined point in said at least one image, based on a given nominal location of a predetermined point on the artefact to be measured within said positioning apparatus' measurement volume. Accordingly, there can be provided an apparatus comprising at least one image device configured to obtain at least two images of an artefact to be inspected from different (e.g. known) perspectives, and at least one analyser device configured to process said images so as to determine the location of said predetermined point in each of the at least two images, based on a given nominal location of a predetermined point to be measured within said measurement apparatus measurement volume.

According to a third aspect of the invention there is provided at least one processor device configured to receive at least one image of the artefact and, based on a given nominal location of a predetermined point on the artefact to be measured within said positioning apparatus' measurement volume, find said predetermined point in said at least one image. Accordingly, there can be provided at least one processor device configured to receive at least two images of an artefact obtained from different (e.g. known) perspectives and, based on a given nominal location of a predetermined point to be measured within said positioning apparatus' measurement volume, determine the location of said predetermined point in each of the at least two images. Optionally, said at least one processor device is configured to control a positioning apparatus so as to obtain said at least two images.

According to a fourth aspect of the invention there is provided computer program code comprising instruction which when executed (e.g. by a processor device) cause the processor device to execute any of the above described methods.

According to a fifth aspect of the invention there is provided a computer readable medium, bearing computer program code as described above.

Figure 2:
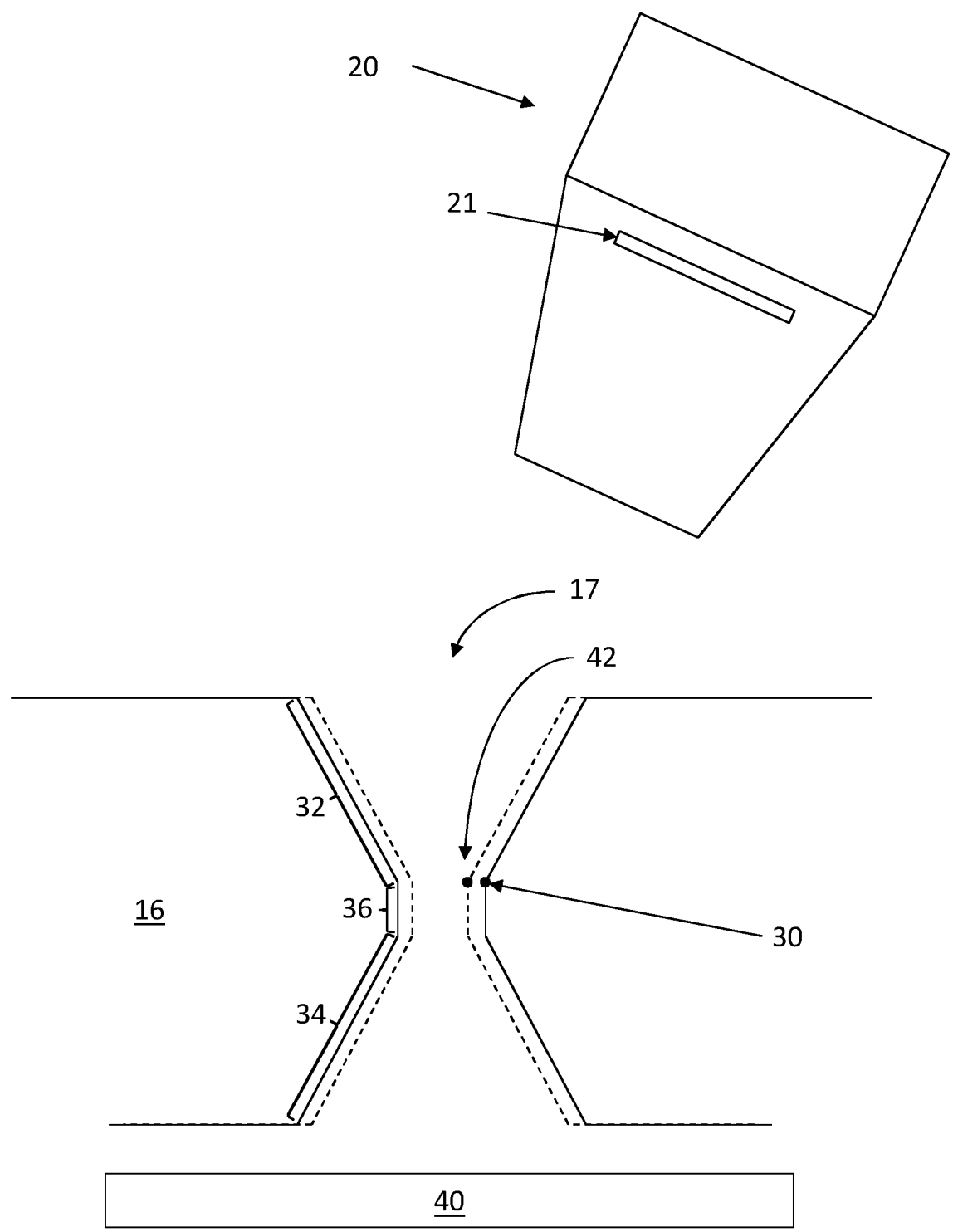
Figure 3:
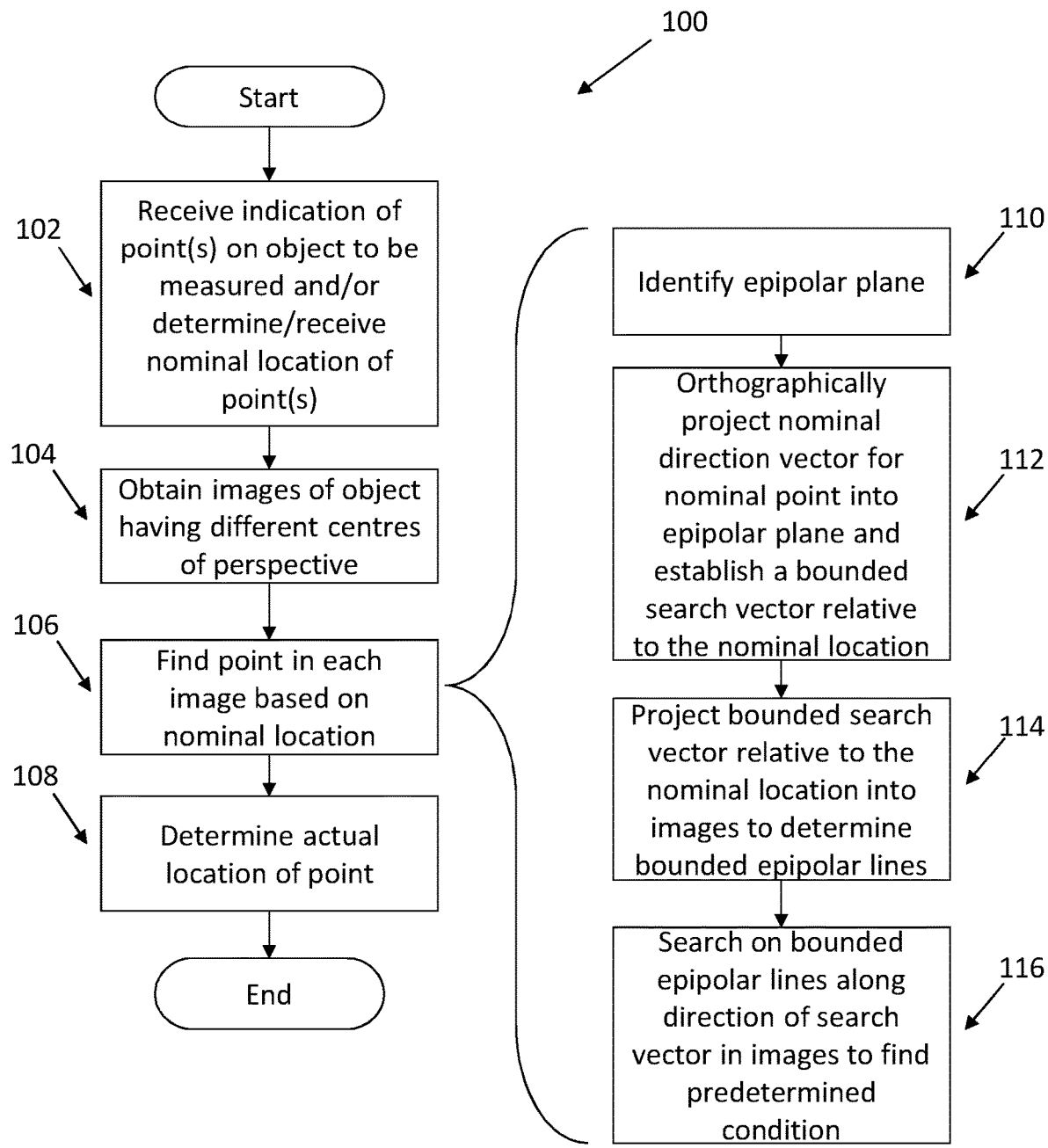
Figure 4:
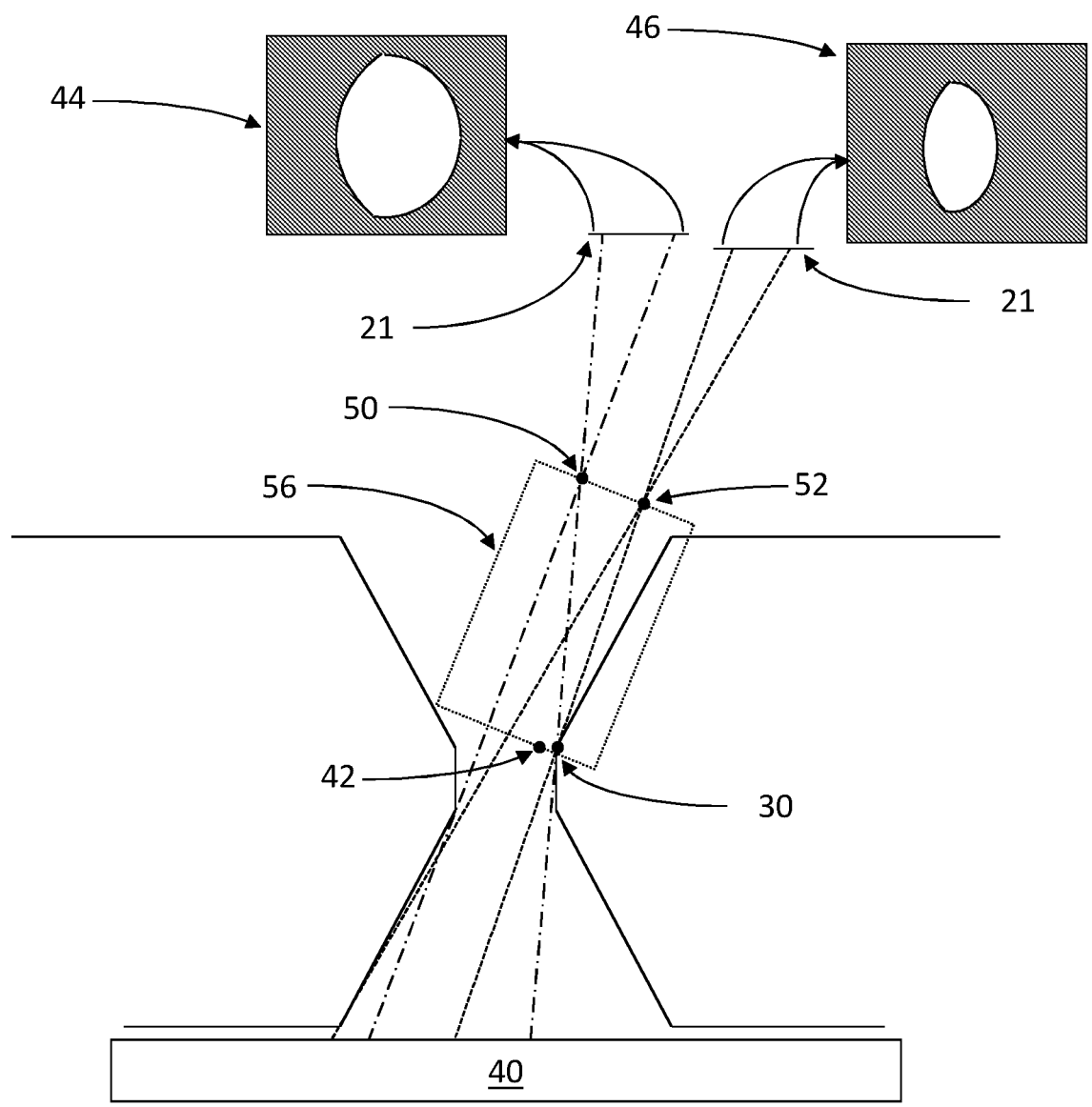
Figure 5:
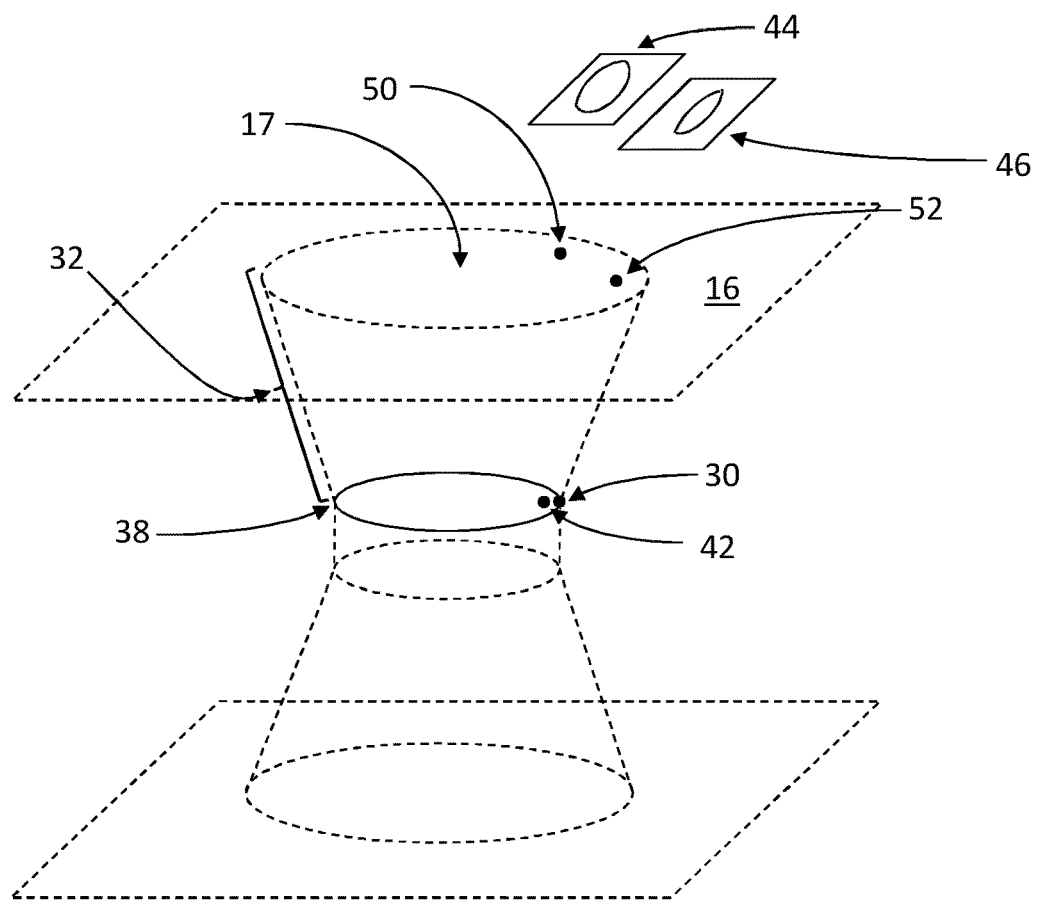
Figure 6:
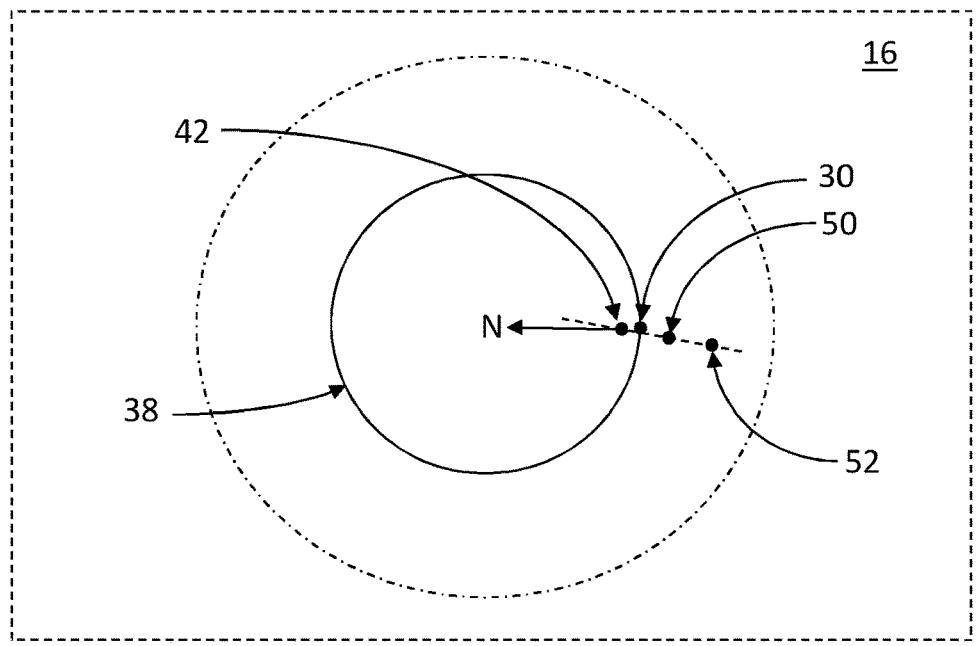
Figure 7:
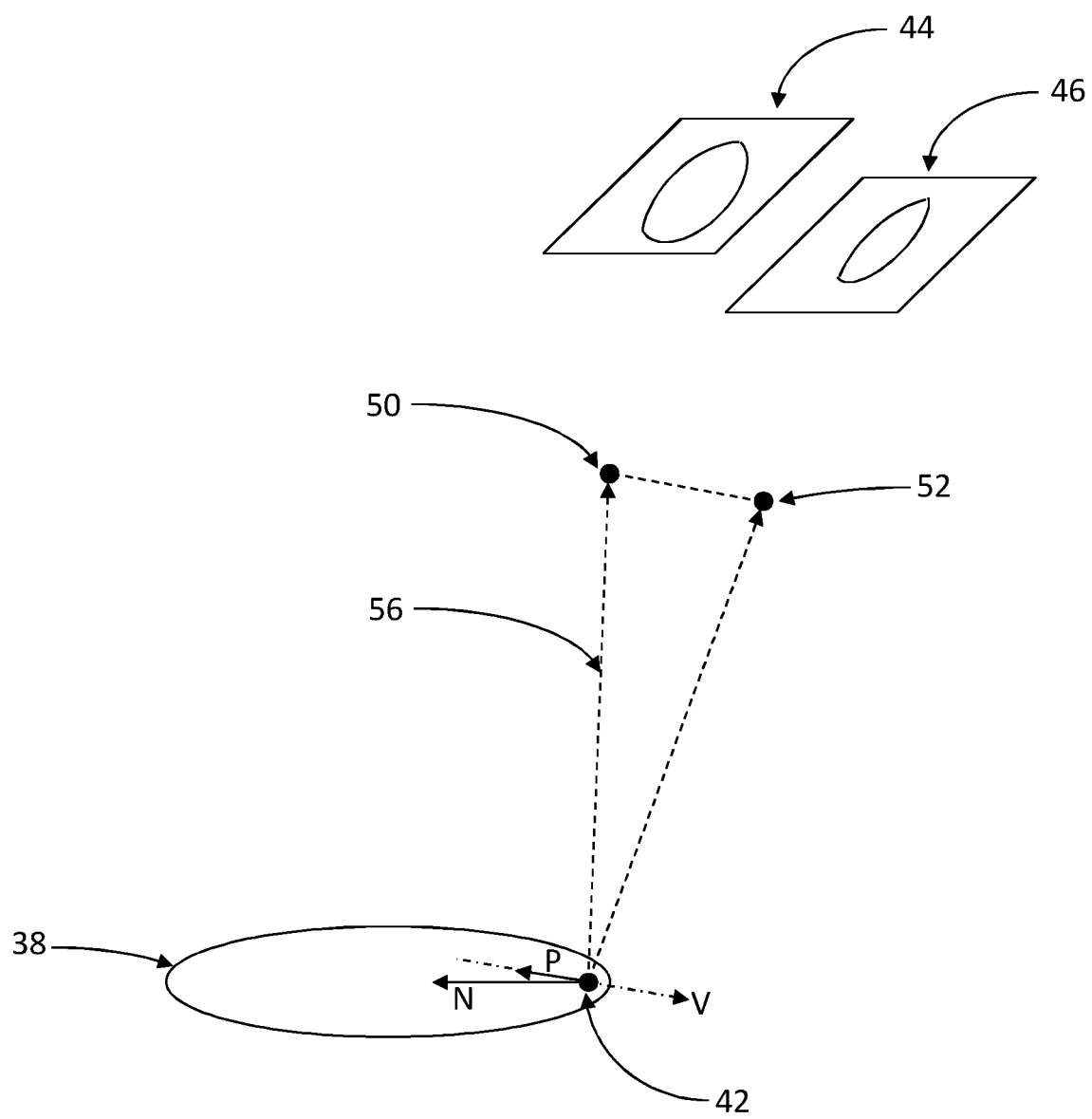
Figure 8:
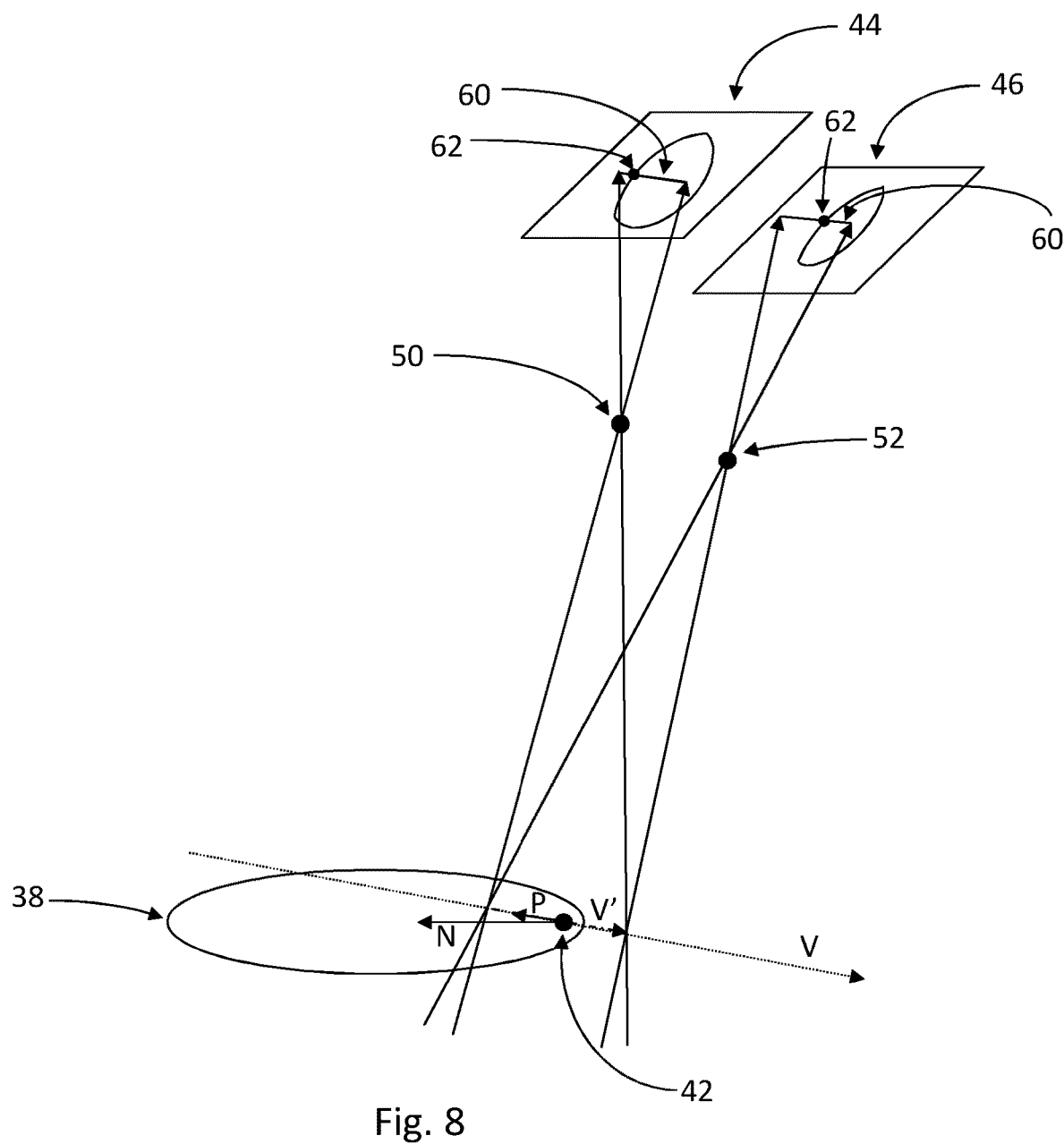
Figure 9:
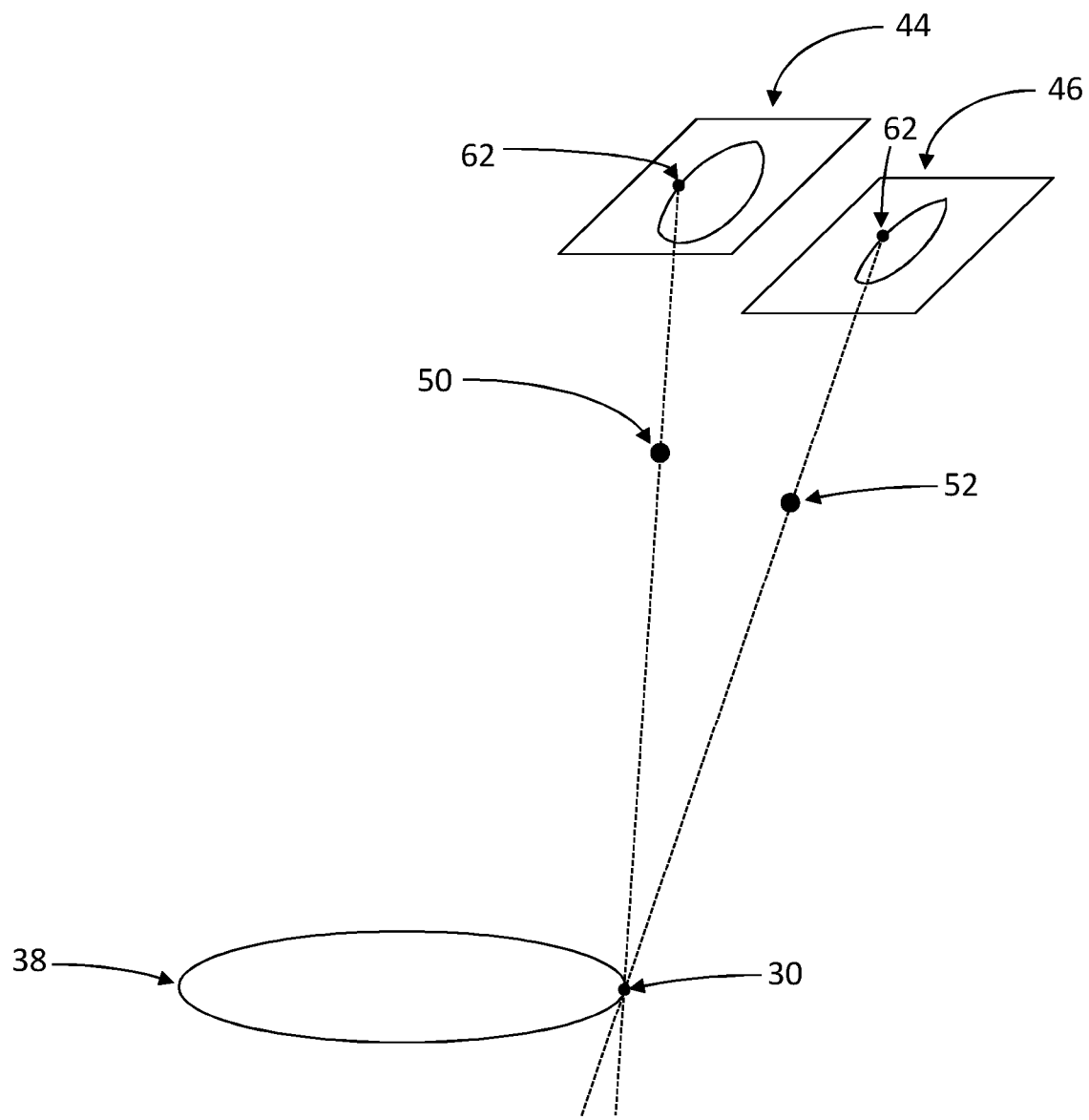
Figure 14:
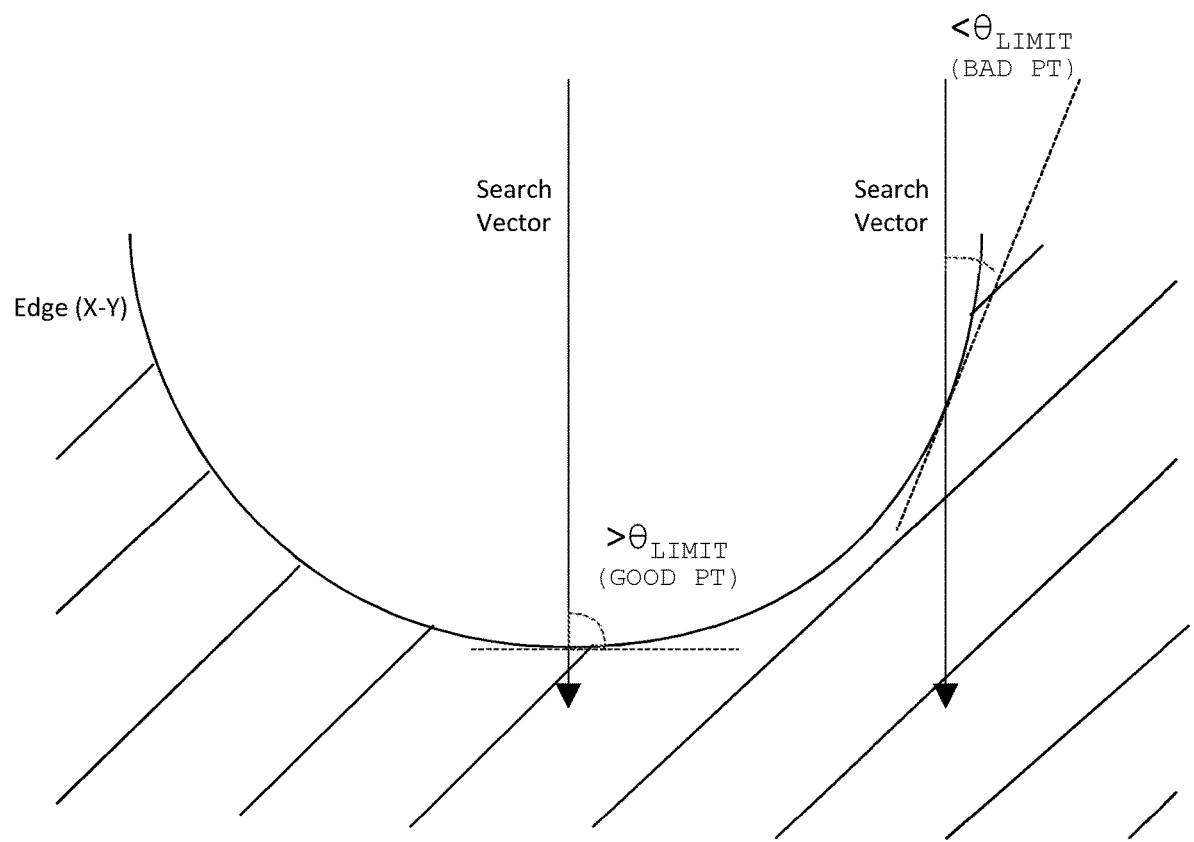

Embodiments of the invention will now be described, by way of example only, with reference to the following drawings, in which:

FIG. 1 illustrates of a camera probe mounted on an articulated head of a coordinate measuring machine (CMM) for measuring an object in accordance with the invention;

FIG. 2 schematically illustrates a cross-sectional view of the nominal form and the actual form a hole to be inspected by the camera probe of FIG. 1;

FIG. 3 is a flow chart illustrates the process of measuring a point in accordance with the invention;

FIG. 4 schematically illustrates silhouette images obtained by the camera probe for the hole of FIG. 2 and associated vector representations of the rays generating said silhouette images;

FIG. 5 schematically illustrates an isometric view of the arrangement of the camera and hole of FIG. 4;

FIG. 6 schematically illustrates a plan view of the arrangement of the centre of perspective of the images with respect to the hole of FIGS. 4 and 5;

FIGS. 7 to 9 schematically illustrate various stages of the process used to determine the location of the point being measured;

FIGS. 10 to 13 schematically illustrate further examples of using the process of the invention to measure a point on an object;

FIG. 14 schematically illustrates the process of establishing the suitability of the search line; and FIGS. 15a to 15c illustrate how the invention can be used to measure multiple points from a single pair of images.

FIG. 1 illustrates an object inspection apparatus according to the invention, comprising a coordinate measuring machine (CMM) 10, a camera probe 20, a controller 22 and a host computer 23. The CMM 10 comprises a table 12 onto which an object 16 can be mounted and a quill 14 which is movable relative to the table 12 in three orthogonal linear dimensions X, Y and Z. An articulated probe head 18 is mounted on the quill 14 and provides rotation about at least two orthogonal axes A1, A2. The camera probe 20 is mounted onto the articulated probe head 18 and is configured to obtain images of the object 16 located on the table 12. The camera probe 20 can thus be moved in X, Y and Z by the CMM 10 and can be rotated about the A1 and A2 axes by the articulated probe head 18. If desired, additional motion may be provided by the CMM or articulated probe head, for example the articulated probe head may provide rotation about the longitudinal axis of the video probe A3. Optionally, the object 16 can be mounted on a rotary table to provide a rotational degree of freedom.

The desired trajectory/course of motion of the camera probe 20 relative to the object 16 can be calculated by the host computer 23 and fed to the controller 22. Motors (not shown) are provided in the CMM 10 and articulated probe head 18 to drive the camera probe 20 to the desired position/orientation under the control of the controller 22 which sends drive signals to the CMM 10 and articulated probe head 18. The positions and orientations of the various axes of the CMM 10 and the articulated probe head 18 are determined by transducers, e.g. position encoders, (not shown) and the positions are fed back to the controller 22. As will be understood, the positions and orientation information can be used during the obtaining of metrological information about a feature of interest.

In the embodiment described, the camera probe 20 can be detachably mounted to the articulated probe head 18. Different (contact or non-contact) probes can be mounted on the articulated probe head 18 in place of the camera probe 20. For example, a contact probe comprising a deflectable stylus for contacting the object 16 can be mounted on the articulated probe head 18. The CMM 10 could comprise a rack for storing a plurality of different probes (e.g. contact and/or non-contact), located within the articulated head's 18 operation volume, such that probes can be automatically interchanged on the articulated head 18.

As illustrated in FIG. 1, the object 16 to be inspected comprises a plurality 19 (or a set 19) of holes 17. In this embodiment, the holes 17 are through-holes in that they pass all the way through the object 16. As will be understood, this need not necessarily be the case; the holes could be blind bores. As will also be understood, the points being inspected do not need to be part of a hole at all.

Methods of inspecting a hole 17 in the object 16 according to the invention will be described with reference to the remaining drawings. A first method according to the invention is illustrated with respect to FIGS. 2 to 9. In this case, the hole 17 has a known/expected form. As illustrated in FIG. 2, in this example, the known/expected form of the hole 17 is generally circular in cross-section but comprises top 32 and bottom 34 tapered/conical sections which narrow to a generally cylindrical bottleneck section 36 toward the middle of the hole. The nominal form of the hole is illustrated by the dashed lines, whereas the actual form is illustrated by the solid lines.

In this example, the technique of the invention is to be used to measure a point lying on the interface 38 between the top tapered section 32 of the hole and the generally cylindrical bottleneck section 36 (see FIG. 5). The operator has therefore selected a predetermined point about said interface 38 on a corresponding CAD model of the object 16. The nominal location 42 of the predetermined point is shown in FIG. 2. However, as shown in FIG. 2, the actual location 30 of the predetermined point is different due to the manufacturing tolerances of the object 16.

As will be understood, the technique can be used to measure a plurality of predetermined points on the object, but for the sake of simplicity of explanation the method will be described for measuring a single point only.

As illustrated in FIGS. 2 and 4, a backlight 40 is provided to back-illuminate the hole 17. Accordingly, in this embodiment, the camera probe 20 obtains silhouette images of the hole. In particular, the camera probe 20 comprises an image sensor 21, e.g. a charge-coupled device (CCD) sensor, on which the hole's silhouette falls. For the sake of simplicity and to aid understanding of the invention, the camera probe 20 is illustrated in the Figures using a pin-hole camera model, but as will be understood, the camera probe 20 can comprise one or more lenses (not shown) in order to form an image on the image sensor 21. Furthermore, as will be understood, back-lighting is not essential. For example, front-lighting could be used.

An example flow-chart for a process 100 according to the invention is shown in FIG. 3. The process begins at step 102 with the receipt of an indication of the point to be measured (the "predetermined point"). This could be achieved, for example, by an operator selecting a point on a model (e.g. CAD model) of the object. For instance, the operator could select the predetermined point by clicking (within a CAD model represented on a graphical user interface on, for example, the host PC 23) on a point on the interface 38 between the top tapered section 32 of the hole and the generally cylindrical bottleneck section 36.

Alternatively/additionally, for example, the operator could select a feature on the CAD model, such as the interface 38 line, and then the computer program could automatically generate one or more points to be inspected based on said selection, e.g. one or more points on the selected feature. Optionally, one or more points to be inspected could be determined/specified by an entirely separate process and received by the current process.

Step 102 also comprises determining the nominal location 42 of the predetermined point to be measured within the CMM's measurement volume. This is the expected location of the predetermined point to be measured within the CMM's measurement volume. This can be determined based on prior knowledge of the position and orientation of the object 16 as a whole, e.g. from a part set-up/alignment process, and/or from known fixturing for the object 16. In the figures, the nominal position is identified by reference numeral 42. As will be understood, instead of (or in addition to) receiving the indication of a predetermined point, the method could merely comprise receiving a nominal point/ location within the CMM's measurement volume, wherein the nominal point/location is taken as the expected position of a point on the object to be measured. As will be understood, a nominal direction vector N can be associated with the predetermined point. Such direction vectors are commonly used in CAD and path planning programs and typically extend normal to the surface of the point to be measured. If the point is at an edge, it can extend normal to either of the surfaces that meet at the edge or direction in between (and the selection of which could depend on what aspect of the part is to be measured). Often such direction vectors are used to dictate the path that a tactile probe takes when moving toward the point to measure it.

Based on the nominal location 42 of the predetermined point to be measured, the process 100 then comprises at step 104 obtaining at least two images of the object which are obtained from different perspectives. In particular, at least first and second images of the object which contain the predetermined point to be measured are obtained from first and second perspectives respectively. The position and orientation of the camera 20 for obtaining the first and second images can be determined automatically (e.g. by host PC 23) based on the nominal location 42 of the predetermined point. For example the camera perspectives can be selected so as to put the predetermined point into contrast with the background, e.g. such that the point is one of many points that forms a silhouette. If desired, the nominal direction vector N can also be used to determine the camera perspectives. For example, in the embodiment described, the position and orientation of the camera 20 for the first and second images are selected so as to ensure that their centres of perspective and the nominal location 42 form a plane that is within a given angle range (e.g. +/−45° (degrees)) to the nominal direction vector; ideally (but not necessarily) the centres of perspective 50, 52 and the nominal location 42 form a plane that is parallel to the nominal direction vector N. FIG. 4 schematically illustrates the capture of two such images. In particular, first 44 and second 46 silhouette images of the hole are shown. Furthermore, the position of the camera probe's image sensor 21, the position of the camera probe's perspective centre at the time the first image was obtained (hereinafter referred to as "first centre of perspective") 50, the position of the camera probe's perspective centre at the time the second image was obtained (hereinafter referred to as "second centre of perspective") 52, and the rays illustrating the outer boundaries of the silhouettes are shown. FIG. 5 illustrates the same configuration of FIG. 4, but in isometric view and without the rays. FIG. 6 illustrates a plan view of the arrangement shown in FIGS. 4 and 5, in which the actual location 30 and the nominal location 42 of the predetermined point, and the first 50 and second 52 centres of perspective are shown.

The next step 106 of the method of the invention comprises finding the point to be measured in each of the first 44 and second 46 images. This is done based on knowledge of the nominal location 42 and nominal direction vector N of the predetermined point. The call-out steps 110 to 116 illustrate one example embodiment of finding the point to be measured in each of the first 44 and second 46 images based on knowledge of the nominal location 42 of the predetermined point. In this example process, the epipolar plane is identified at step 110. This is the plane that is defined by (in particular, contains) the first 50 and second 52 centres of perspective and the nominal location 42. The epipolar plane is schematically illustrated in FIG. 4 and is identified by reference numeral 56. At step 112 the nominal direction vector N is projected (e.g. orthographically) into the epipolar plane so as to define the search vector. As will be understood, if the epipolar plane 56 is already parallel to (contains) the nominal direction vector N, then this step is superfluous and could be omitted. As illustrated most clearly in FIG. 6, this isn't the case in the particular example. Accordingly, as illustrated by FIG. 7, the nominal direction vector N is projected (e.g. orthographically) into the epipolar plane, the result of such projection being illustrated by vector P in FIG. 7, which then defines the search vector V which is the negative of vector P. As shown, both P and V are relative to/pass through the nominal location.

In the embodiment described, bounds are then applied to the search vector V, such that it starts and ends at specified search distances before and after the nominal location 42. The search distances can be predetermined, e.g. automatically or manually, and are used to limit or "bound" the distance along the vector V relative to the nominal location 42 that the point is to be searched for within the images. This bounded search vector V' relative to the nominal location 42 can then be used to establish a bounded search line 60 (which happens to be a bounded epipolar line) in each of the first 44 and second 46 images along which to search for the actual location 30 of the predetermined point.

In particular, at step 114 the bounded search/epipolar line 60 is determined by projecting the bounded search vector V' into the images (e.g. via perspective projection). If lens distortions are taken into account, the bounded search/epipolar line 60 may not be a straight line. If lens distortions are ignored, or if (for example) the images have been processed to remove distortions (e.g. remove distortions known from camera calibration), then the bounded search/epipolar line 60 can be a straight line.

As will be understood, vector P itself could be the search vector, rather than having to find its negative V. The vector P itself could therefore be projected into the images to define the search/epipolar line 60. If bounds are desired, bounds could be applied to the vector P, to define a bounded vector P' relative to the nominal location, which is then projected (e.g. via perspective projection) into the images to define the bounded search/epipolar line 60.

As will also be understood, it is not necessary to bound the vector P or V, or the search/epipolar line 60, but doing so can help to focus the search on a particular region in which the point is expected to be.

Then at step 116 a search for a predetermined condition along the bounded epipolar line 60 is performed. In the particular example, a search for a transition (e.g. a predetermined threshold rate of change in contrast, or other suitable property of the image) in the image is performed so as to identify the point 62 at which the bounded epipolar line 60 crosses the image of the edge of the silhouette. This point 62 is then determined to be the point in the image 44, 46 which corresponds to the actual location 30 of the predetermined point on the object 16. Therefore, at step 108, and as illustrated by FIG. 9, the actual position 30 of the predetermined point within the CMM's measurement volume can be triangulated (e.g. using standard photogrammetry/stereophotogrammetry techniques).

In summary, and as will be understood by a skilled person, such triangulation can be performed based on the two-dimensional coordinates of the determined point 62 in each the images 44, 46 and based on the knowledge of the relative location and orientation of the camera probe 20 which took the images (which can be known from the outputs of the CMM's position encoders). As will be understood, photogrammetry techniques other than triangulation can be used to determine the actual location 30 of the predetermined point. For example, a disparity map and/or bundle adjustment could be used instead of or as well as triangulation. In particular, for example, if more than one point is to be measured an error minimisation technique such as bundle adjustment can be used to simultaneously calculate the positions of multiple points.

Figure 10:
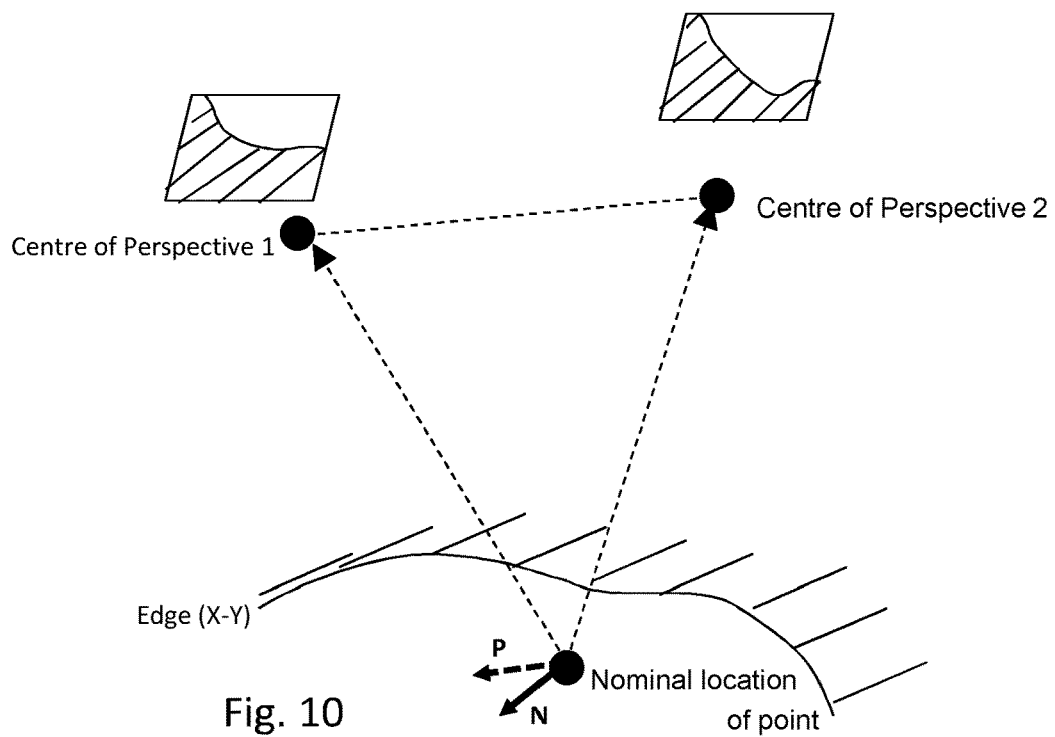
Figure 11:
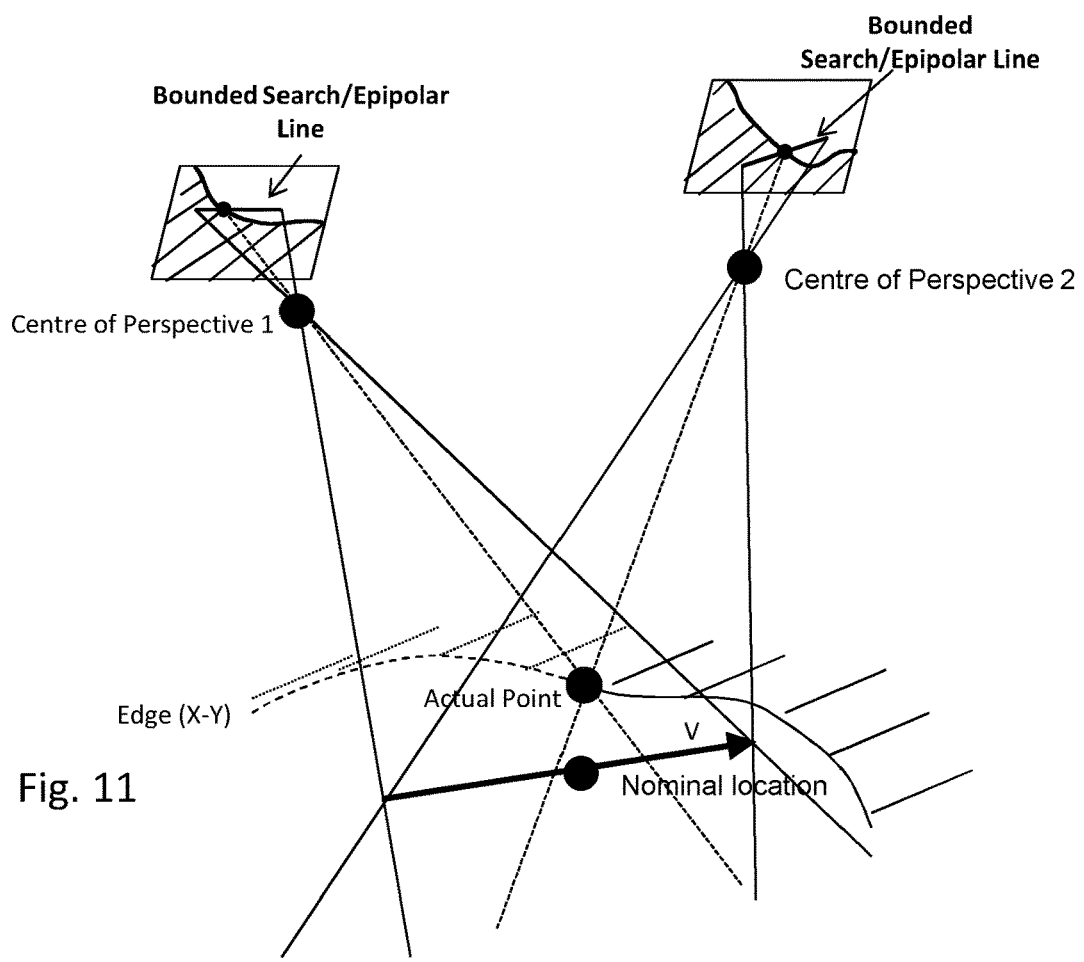

In the embodiment described above, the point to be inspected lay on a circular intersection line. However, as will be understood, the invention can be used to find and measure a point on other features, such as an irregularly shaped edge. FIGS. 10 and 11 illustrate such an embodiment. As shown in FIG. 10, the nominal location of the predetermined point to be inspected is identified, and two images of the edge which capture said nominal location are obtained. The centre of perspectives of the two images and the nominal location define an epipolar plane. The normal vector N of the point is projected P into the epipolar plane, which defines the search vector V. As illustrated by FIG. 11, the search vector V is projected into the first and second images to define the bounded search/epipolar lines along which a search is performed to identify the edge. The point at which the bounded epipolar line crosses the edge is identified as the predetermined point to be inspected. The identified point in each image is then used to measure the location of the predetermined point in the CMM's measurement volume, e.g. via triangulation.

Figure 12:
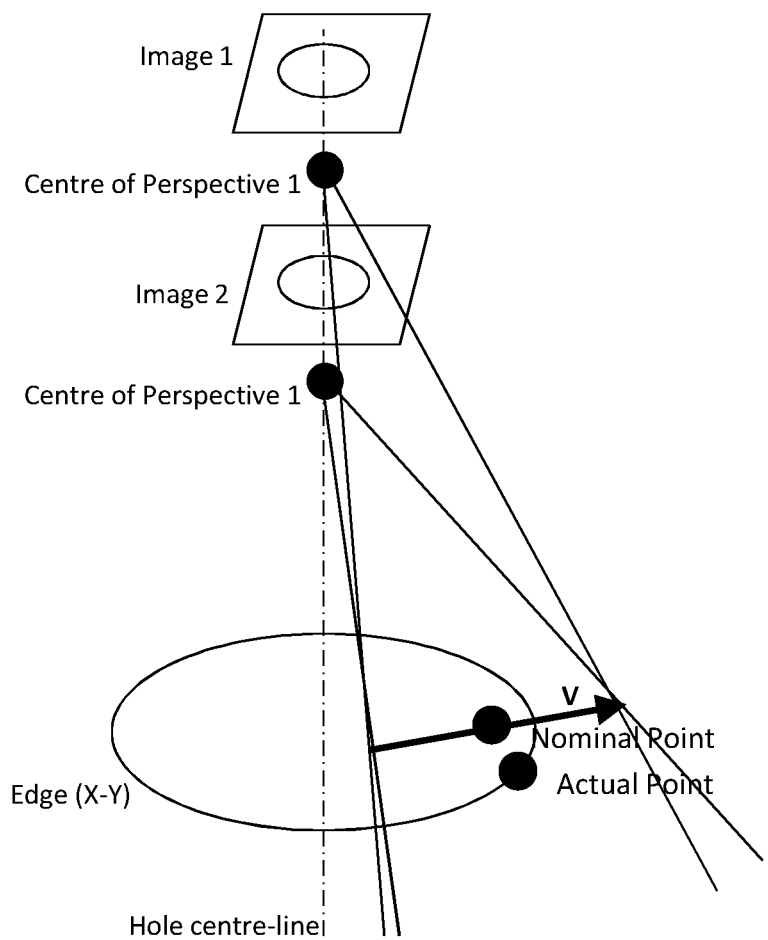

In the above described embodiments the change in perspective is achieved by a change in position and orientation of the camera probe. However, as will be understood, this need not necessarily be the case. For example, a change in perspective could be achieved by a change in position only. FIG. 12 illustrates a specific example of this, in particular of how the same technique can be used to find a point on a hole, even if the first and second images are obtained from the same camera orientation (angular position) and from positions in which their centre of perspectives both lie on the centre-line of a hole. Accordingly, the perspective can be different by virtue of the image being obtained from a different position, and does not necessary require a change in orientation. Such a technique can be particularly useful when inspecting the bottom of a hole (in other words the end of the hole distal to the end at which the probe is positioned). As will be understood, in contrast to what is shown in FIG. 12, the perspective centres don't necessarily both have to lie on the hole's centre-line; one or both could be off the centre-line (e.g. they could be position such that a line containing them is parallel to the centre-line, or even non-parallel). As will also be understood, in contrast, the perspective could also be different by virtue of the image being obtained from a different orientation without any change in lateral position of the camera probe (e.g. the rotation not being centred on the perspective centre).

Figure 13:
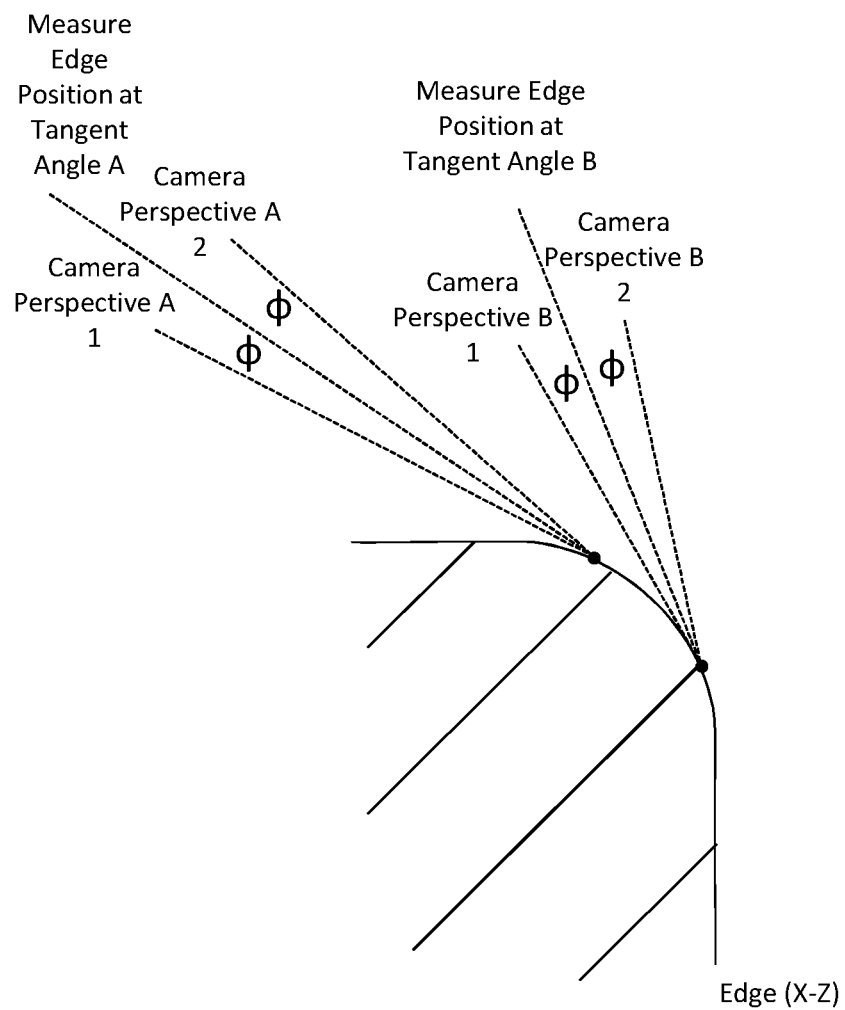

FIG. 13 illustrates how the cross-sectional shape of an edge can be profiled by inspecting different points along its cross-section. As shown, in this embodiment, the images for each point are taken on either side of the tangent to the edge at said point.

It has been found that the accuracy of the method can be greater when the angle between the bounded search/epipolar line and the surface of the object (in this case the edge) as imaged is greater. In other words, the closer the angle between the bounded search/epipolar line and the surface of the object as imaged is to 90° (degrees), i.e. normal, the greater the potential accuracy of the described technique. Accordingly, as schematically represented in FIG. 14, an optional additional step of the method could be to determine the angle θ between the bounded search/epipolar line and the surface of the object as imaged at the point they intersect. If θ is below a predetermined threshold level, then the determination of the location of the point can be abandoned on the basis that the accuracy will be too low. As will be understood, the threshold level can depend on various factors including for example, the required accuracy of the measurement, and the resolution of the images. By way of example only, our inventors have found that for their system, and for their required accuracy, a threshold angle of 45° (degrees) is appropriate.

FIGS. 15a to 15c illustrate how the invention can also be used to measure multiple predetermined points 30a, 30b, 30c from the same pair of images. As shown, the centres of perspectives 50, 52 of the first 44 and second 46 images along with the nominal location 42a, 42b, 42c of each predetermined point can form an epipolar plane 56a, 56b, 56c. In line with the above description, search vectors can then be formed by projecting (e.g. orthographically) the nominal direction vector for each predetermined point into the respective epipolar plane (56a, 56b, 56c), which can then be projected (e.g. via perspective projection) into the first 44 and second 46 images as a bounded epipolar line which can be searched along so as to find the predetermined points in each of the images (which can, if desired, be used so as to triangulate the actual location 30*a*, 30*b*, 30*c* of the predetermined points in the CMM's measurement volume).

Optionally, in contrast to the above described embodiments, the search line could be determined independently from the nominal direction vector. For instance, the search line could be determined from the epipolar plane defined by the centre of perspectives of the at least two images and the nominal location (e.g. a line/vector contained within the epipolar plane could be projected into the images). Accordingly, even if there was no nominal direction vector associated with the predetermined point, an operator could manually choose the centre of perspective for each image (ideally, but not necessarily, which put them in positions such that they, along with the nominal location, define an epipolar plane that is substantially normal to the surface at the predetermined point), and then the method of the invention can determine the search line based on the epipolar lines for said images.

The above embodiments comprise obtaining two images and finding the predetermined point in each of the images. As will be understood, the invention could be used to find the point in a greater number of images. Furthermore, the invention can be used to find a predetermined point in just one image. This is the case even if just one image is obtained (or used). For example, based on the nominal location of the point to be measured, a search line in the image could be derived (e.g. by projecting a predetermined search vector/ nominal direction vector associated with the point, into the image), and the predetermined point can be determined as being where the search line intersects the surface as imaged (e.g. where a threshold rate of change in a property of the image is met). Such a process could comprise ambiguity of the actual location of the predetermined point in the Z direction (i.e. perpendicular to the image plane). Accordingly, either the position in Z could be assumed or determined/deduced from another measurement of the artefact (e.g. a tactile measurement of where at least a part of the artefact is in Z).

In additional/alternative embodiment, the point could lie on a marker placed or projected onto the object. For example, a bright line could be projected on the object, and it might be desirable to measure the location of a given point on the line. Accordingly, the method of the invention can be used, e.g. by using the same technique but in which in the images it is determined where the bounded epipolar line crosses the imaged bright line. The nominal point(s) could be picked from the expected edge of the bright line on the part (using CAD) while the associated direction vector(s) would ideally (but not necessarily) be normal to the bright line, typically between tangent and normal to the surface. In this case, the centres of perspective of the images could be chosen such the epipolar plane they, along with the nominal location, define intersect with the bright line at an angle complying with the above described requirements (e.g. at an angle not less than 45 degrees, and preferably at an angle that is substantially perpendicular).

In an additional/alternative embodiment, the point could lie on a surface feature. For example, the surface feature could be printed or texture. The surface feature could be known or unknown and potentially random. Where the surface feature is known, the nominal point could be picked from an expected edge and where the surface feature is unknown or random, the nominal point could be chosen where a surface feature edge is expected. In either case, as with the above described embodiments, the associated nominal direction vector(s) should ideally (but not necessarily) be normal to the expected edge and parallel to the surface. The search distance(s) (which define the bounds on the search line) can be chosen to be less than the expected repeat distance of the surface feature. As with the other embodiments, a search along the search line for a predetermined change in the image can be performed to determine where the search line crosses the feature (and thereby define the location of the point to be found).

In the embodiment described, the point is a single point on the object. As will be understood, the point could define the location of an aspect, feature, or pattern for example. For example, the point could define the position of a corner feature of the object. Optionally, the point could define the position of a pixel-signature (e.g. a map of grey-scale values) of a group of pixels.

As will be understood, multiple points measured via the method of the invention (and/or via other techniques) can be considered together to describe an aspect/feature of the object. For example, multiple points could be taken along an edge, which together describe the shape, position and/or size of the edge. For instance, multiple points could be taken around the top or bottom of a hole, or even an edge/lip located within a hole, and together they can be used to describe the shape/position/size of the edge, e.g. for finding the diameter of the hole. Multiple points can also be grouped/considered together to describe the three-dimensional form of a surface. As will be understood, the method can comprise fitting multiple points to a feature (or a feature to multiple points), e.g. a regular or irregular shape, such as a line (straight or not straight), circle, or even three-dimensional shapes, e.g. cylinders or non-regular three-dimensional shapes. For example, optionally, a mesh-model could be fitted to the points.

In the above described embodiment, the images obtained by the camera probe 20 are passed to the host PC 23 which is configured with software for processing the images to find the predetermined point in each of the images and then to determine the actual location of the predetermined point within the CMM's 10 measurement volume. As will be understood, this need not necessarily be the case. For instance, a separate (e.g. bespoke) processor/analyser device could be provided which is configured to process the images in accordance with the invention. If desired, multiple processor/analyser devices could be used. For example, one for analysing the images to identify the predetermined point within the images and another for then determining the actual location of the predetermined point within CMM's measurement volume. As an alternative example, the controller 22 could perform at least some of the processing of the images to determine the actual location of the predetermined point.

The invention claimed is:

1. A method of inspecting an artefact that is located within a positioning apparatus measurement volume, the method comprising:
    receiving at least one image of the artefact that is located within the positioning apparatus measurement volume and which is obtained by inspecting the artefact; and,
    for a predetermined point on the artefact to be measured, determining the location of said predetermined point in said at least one image based on a given nominal location of the predetermined point within the positioning apparatus measurement volume, where the given nominal location is an expected location of the predetermined point within the positioning apparatus measurement volume.

2. The method as claimed in claim 1, comprising determining the actual location of said predetermined point in said positioning apparatus measurement volume based on the determined location of the predetermined point in said at least one image.

3. The method as claimed in claim 2, in which determining the actual location comprises triangulating the actual location of said predetermined point in said positioning apparatus measurement volume.

4. The method as claimed in claim 1, comprising obtaining at least two images of the artefact and, based on the given nominal location of the predetermined point to be measured within said positioning apparatus measurement volume, determining the location of said predetermined point in each of the at least two images.

5. The method as claimed in claim 4, in which said predetermined point comprises a point on an edge of said artefact, and in which said at least two images comprise contrast/silhouette images of the edge.

6. The method as claimed in claim 1, comprising receiving an indication of a predetermined point on the artefact and determining the nominal location of said predetermined point within said positioning apparatus measurement volume.

7. The method as claimed in claim 6, in which said indication of the predetermined point on the artefact comprises an identified point on a computer representation of the artefact.

8. The method as claimed in claim 1, in which said predetermined point comprises a point on an edge of said artefact.

9. The method as claimed in claim 1, in which said determining the location of said predetermined point in the at least one image comprises determining a search line along which to search within the image, and identifying where along said search line the image meets predetermined criteria.

10. The method as claimed in claim 9, in which said predetermined criteria comprises a threshold rate of change in a property of the image.

11. The method as claimed in claim 9, in which said search line is derived from a plane containing the perspective centres of at least two images and said nominal location of said predetermined point.

12. The method as claimed in claim 11, comprising projecting a nominal direction vector associated with the predetermined point to be measured into the plane containing the perspective centres of the at least two images and said nominal location of said predetermined point.

13. The method as claimed in claim 9, in which determining the search line comprises projecting a nominal direction vector associated with the predetermined point to be measured into the at least one image.

14. The method as claimed in claim 13, in which projecting the nominal direction vector is done via orthographic and/or perspective projection.

15. The method as claimed in claim 9, in which the search line is bounded.

16. The method as claimed in claim 9, comprising determining whether the angle of intersection between said search line and the imaged surface of the artefact meets predetermined threshold criteria.

17. The method as claimed in claim 1, comprising automatically determining the perspective from which to obtain the at least one image based on the nominal location of said predetermined point.

18. The method as claimed in claim 1, comprising determining the locations of a plurality of predetermined points in said at least one image, based on given nominal locations of the plurality of predetermined points to be measured within said positioning apparatus measurement volume.

19. The method as claimed in claim 1, in which the image of the artefact is obtained by inspecting the artefact with an imaging device capturing at least one image of the artefact.

20. A non-transitory computer readable medium bearing computer program code comprising instructions configured such that when executed by a processor device cause the processor device to execute the method of claim 1.

21. An apparatus comprising at least one processor device configured to: (i) receive at least one image of an artefact that is located within a positioning apparatus measurement volume and which is obtained by inspecting the artefact, and, (ii) for a predetermined point on the artefact to be measured, find said predetermined point in said at least one image based on a given nominal location of the predetermined point within the positioning apparatus measurement volume, where the given nominal location is an expected location of the predetermined point within the positioning apparatus measurement volume.

22. The apparatus as claimed in claim 21 comprising at least one imaging device configured to capture at least one image of the artefact.

* * * * *